United States Patent Office 3,084,260
Patented Apr. 2, 1963

3,084,260
METHOD OF DETERMINING CRITICAL LUBRICATION AREAS IN MACHINERY
Michael J. Furey, Berkeley Heights, N.J., assignor to Esso Research and Engineering Company, a corporation of Delaware
No Drawing. Filed Sept. 30, 1959, Ser. No. 843,362
6 Claims. (Cl. 250—106)

This invention relates to a method of locating critical areas of boundary lubrication and predicting wear in moving parts of machinery. The method comprises contacting parts subject to friction with a radioactive material capable of reacting either chemically (as by combining) or physically (as by adhering) with said parts under the heat generated by said friction, followed by examination of said parts to determine the extent of radiation of the part to thereby indicate critical lubrication areas.

In the design and construction of machinery having contacting parts subject to heavy loading and high stress, it is frequently of value to the designer to be able to determine areas of critical lubrication where parts are potentially subject to wear and the extent of pressures and stresses encountered by the parts in actual operation. Previously, this could only be done by operating the machinery, dismantling it and then trying to determine changes in weight caused by loss of material due to wear or to examine the surface of the parts for distortions or signs of wear. Such tests are substantially inaccurate and usually require a long period of time to carry out. With the present invention a rapid, simple method is provided for the location of such areas and determination of the relative extent or degree of breakdown of lubricant films. This method is particularly applicable in design of machines having very fine tolerances and closely fitted parts where wear is most likely to occur. Such wear depends upon the geometry of the rubbing parts, their sliding speed, the composition of the lubricant, pressures, etc. With the present method, by varying only one of these variables at a time, its contributing effect to wear can be determined. For example, by applying the present method to duplicate systems in which only pressure is varied, the designer can determine the effect of pressure in that system upon wear and friction.

In this method, the parts are lubricated for a short time with an oil containing a radioactive tracer which in some way not clearly understood combines with the metal of the rubbing surfaces under the severe conditions of heat and pressure existing at their surfaces. Next, the machine or parts are disassembled and checked for radioactivity either by a counting device or by making an autoradiograph or by other detection and measuring means for radioactivity. Once the designer knows which areas are critical with regard to lubrication, he can then redesign these parts to alleviate or to correct the conditions involved. Thus, a new tool is placed in the hands of the designer and technician, since he can now make accurate determinations of areas subject to high friction and wear in machinery having contacting moving parts, thereby permitting the better design of such equipment.

As stated above, the exact mechanism resulting in the deposition of a radioactive film at critical lubrication areas is not entirely understood. The terms critical lubrication areas or boundary lubrication areas as used in this specification describe those areas in which the lubricant film separating the relative moving surfaces breaks down to some degree. Breakdown of the lubricant film to give surface-to-surface contact may be influenced by a variety of factors including surface roughness, load, speed, type of motion, and the geometry of the relatively moving parts. The transition from hydrodynamic lubrication, where the oil film is at all times intact, to boundary lubrication is not abrupt but gradual. Thus, as the applied load on the lubricated parts becomes greater, the moving parts come closer together. Eventually the parts come close enough together so that the highest microscopic surface asperities on one surface rub against corresponding high points on the opposing surface rupturing the lubricant film. With increasing severity of operation the number of such points of lubricant film rupture will increase. It is at these points of actual surface-to-surface contact that the radioactive film deposited according to the present invention appears to be laid down. While the reaction leading to the deposition of the radioactive film appears to be chemical in nature, this point is not clearly established. It is possible that strong physical adhesion or adsorption is involved. In any event, from the experimental evidence it is clear that the film is selectively formed in critical lubrication areas. Essentially no film is formed on surfaces subject to no great loading stress. It can further be seen that the deposition of radioactive film is proportional to the criticality of the area being lubricated. Thus those areas known to show highest wear in service show the most intense radioactivity when investigated according to the method of this invention; areas subject to moderate wear show less but still significant radioactivity; essentially wear-free areas show essentially no radioactivity.

While the preferred embodiment of the invention herein described involves the use of a specific radioactive material and ferrous metal moving parts, it is obvious that the broad concept of the invention is applicable to other systems. Thus plastic parts, for example nylon gears, may be investigated by this method. The chief requirement for the tracer is that it does not react with the machinery material under no-load conditions.

The radioactive tracer used in a preferred embodiment of the present invention is a material which will react with metal surfaces, e.g. ferrous surfaces, under conditions of heat and pressure encountered in areas of boundary lubrication to deposit, either chemically or by absorption, a portion of the radioactive material upon the metal surfaces. Preferably, this radioactive material is also oil-soluble so that it may readily be applied to the parts to be tested in a lubricating oil solution. One type of material which has been found exceedingly effective for this purpose are metal dialkyl dithiophosphates prepared from radioactive phosphorus. These materials may be represented by the following formula:

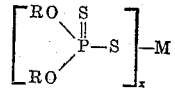

wherein each R is an alkyl group containing 3 to 15, preferably 3 to 8 carbon atoms, and M is a metal such as zinc, cadmium, nickel, iron, copper, cobalt or in fact any other metal which will produce an oil-soluble dialkyl dithiophosphate. "x" is the valence of the metal, while at least a portion of phosphorus of the dithiophosphate is $P^{32}$. Phosphorus 32 is a radioactive isotope, being a strong beta particle emitter decaying with a half-life of 14.3 days, said beta particles having a maximum energy of 1.7 mev. (million electron volts). The radioactive material may be prepared as follows:

First, an intimate mixture of neutron-irradiated red phosphorus and sulfur is heated in a carbon dioxide atmosphere to form radioactive or $P^{32}$ labeled $P_2S_5$. Preparation of $P_2S_5$ by this method is well known. Next, the radioactive $P_2S_5$ is reacted with an alcohol to form the dithiophosphoric acid in the conventional way, e.g. by heating to a temperature of 185° to 190° F. for a time of about 1 to 3 hours. Following this the acid may be neutralized with a metal base, e.g. zinc oxide, in order to form the metal dialkyl dithiophosphate. Another method is to react the dithiophosphoric acid with sodium methylate, then further react with a metal salt of the desired metal to give the desired metal dithiophosphate. One advantage of this latter method is that a more pure material can be made.

In order to regulate the radioactivity of the dithiophosphate, it is best to prepare a mixture of radioactive and non-radioactive dithiophosphate to form a final mixture having a specific activity of 0.01 to 5.0, preferably 0.1 to 1.0 millicurie per gram. One convenient way of forming the mixture is to simply react a blend of radioactive $P_2S_5$ with non-radioactive $P_2S_5$ together with the alcohol to form the dithiophosphoric acid.

The oil used to carry the dithiophosphate to the contacting surfaces is preferably a lubricating oil which may be either a mineral lubricating oil or a synthetic oil. Examples of such synthetic oils include diesters such as di-2-ethylhexyl sebacate, polyglycols such as the Ucon oils, polysilicones and silanes, etc.

The oil may contain 0.1 to 5.0, preferably 0.5 to 2.0 weight percent of the dithiophosphate additive. The oil solutions are prepared by dissolving the dithiophosphate into the oil by simple mixing and stirring.

Several techniques are available for determination of the degree of radioactivity imparted to the contacting surfaces. One technique is to cover the part with photographic film and then place the part in a dark area for a sufficient period of time, develop the film and examine it for those areas showing radioactive exposure. A quick technique is to simply move a Geiger counter or other radiation counter over the metal part to be examined noting those areas having a high counting rate. Another method is to remove the surface films e.g. by wiping the area to be tested, with a cloth or paper dipped in weak hydrochloric acid. The hydrochloric acid dissolves the radioactive film which now adheres to the paper or cloth, which in turn is then tested with a counter. The advantages of this latter method is that it eliminates the effect of radiation of adjacent areas and permits a more accurate analysis than merely moving a counter over the areas to be tested.

The invention will be further understood by reference to the following examples which include preferred embodiments of the invention:

EXAMPLE 1.—PREPARATION OF RADIOACTIVE ZINC DIALKYL DITHIOPHOSPHATE 124.6 grams of 4-methyl-2-pentanol was added to a 4-neck flask equipped with a thermometer, stirrer, condenser and a nitrogen inlet. The alcohol was warmed to a temperature of about 180° F. 575 grams of a radioactive $P_2S_5$ having a specific activity of 4 millicuries per gram was added to the flask. Then, 63.5 grams of a non-radioactive $P_2S_5$ was slowly added over a period of about 40 minutes while cooling the flask to maintain a temperature of about 185° F. After the addition of all the $P_2S_5$, nitrogen was bubbled through the mixture. The temperature was maintained at 185° to 190° F. for 2 hours under the nitrogen blanket, and then cooled to room temperature. Next, 100 ml. of methyl alcohol was added to the mixture to reduce its viscosity so that it could be readily filtered through filter paper. After filtering, another 50 ml. of methyl alcohol was used to wash down the filter paper. Phenolphthalein indicator was added to the filtrate which was next neutralized with a solution of sodium methylate and methyl alcohol. 100 ml. of water was added to the solution followed by the addition of 200 ml. of hexane to remove any organic impurities. The water layer was next removed and a total of 415 grams of zinc chloride solution (20 wt. percent zinc chloride in water) was added to the aqueous layer to form the zinc di-(4-methyl-2-pentanol) dithiophosphate which appeared as a white gelatinous mass. The material was then extracted twice with hexane using first 1 liter of hexane and second ½ liter of hexane. Then the hexane portions were combined and mixed with 200 grams of water to remove into the water layer any inorganic impurities such as zinc chloride or sodium chloride. The mixture was then separated and filtered, and 200 grams of anhydrous sodium sulfate was added to remove any traces of water. After filtration, the hexane was evaporated to leave the zinc dithiophosphate product.

The zinc dithiophosphate prepared above had a radioactivity of about 0.11 millicurie per gram. This material appeared as a pale yellow viscous fluid and a yield of about 200 grams was obtained by the above described procedure.

*Engine Test*

To demonstrate the present method, two tests were run using an automotive engine. In carrying out these tests, two oil solutions were made, each containing 1.3 weight percent of the zinc dialkyl dithiophosphate in a paraffinic mineral lubricating oil. One of these oil compositions further contained a small amount of a polymeric viscosity index improver such as commonly used in preparing 10W-30 type of commercial crankcase lubricants. The second oil also contained the same polymeric V.I. improver and in addition contained a small amount of a detergent inhibitor.

The above two lubricating oils were used to operate a V-8 overhead valve type gasoline engine having a displacement of 331 cubic inches. This engine was equipped with both steel and alloy cast iron valve lifters. The camshaft was of an alloy cast iron. The engine was first run using the non-detergent radioactive oil composition described above for three hours at 1,000 r.p.m. with no load and with the valve lifters under normal spring tension, while the jacket outlet temperature of the circulating water was controlled at 180° F., and the oil temperature ran between 180° and 190° F. After 3 hours of operation, the engine was shut off, the valve lifters removed, disassembled, rinsed in hexane to remove residual oil and examined for radioactivity. The engine was drained and rinsed with non-additive-containing oil. Next, the crankcase was filled with the detergent-containing oil and the test sequence repeated. After completion of the second test run using the detergent oil, the engine was drained, flushed with hydrocarbon solvent and completely disassembled. All parts were rinsed in hexane to remove the oil and examined for radioactivity.

Briefly, each part was wiped with small circles of filter paper moistened with dilute HCl. The filter paper was then dried and counted with a Geiger counter. The relative radioactivity per unit area of the various engine parts was determined by dividing the rate of radiation by the surface area involved. The counting techniques used are described in detail in the paper "Film Formation by an Antiwear Additive in an Automotive Engine," by M. J. Furey, ASLE Transactions, vol. 2, No. 1, (April 1959), pp. 91–100. The results are summarized in the following table:

RADIOACTIVITY OF VARIOUS ENGINE PARTS AFTER TESTS WITH OILS CONTAINING P³²-LABELED ZINC DI (C₆) ALKYL DITHIOPHOSPHATE

| Part or Section [1] | Relative Activity Per Unit of Area [1] |
|---|---|
| Valve Train Mechanism: | |
| Valve lifter face [2] | 100. |
| Valve lifter side [2] | 1. |
| Cam surface | 44. |
| Lower end of push rod | 32. |
| Push rod body | 0. |
| Upper end of push rod | 8. |
| Rocket arm socket | 20. |
| Inner bearing area of rocker arm | 11. |
| Bearing area of rocker arm shaft | 3. |
| Rocker arm pad | 25. |
| Valve stem top | 66. |
| Other Parts: | |
| End of fuel pump push rod | 43. |
| Drive gear teeth on distributor | 7. |
| Piston ring flats | 5. |
| Piston ring face | 3. |
| Fuel pump eccentric | 2. |
| Camshaft sprocket teeth | 2. |
| Crankshaft sprocket teeth | 1. |
| Camshaft bearing | |
| Cylinder wall | <1 but significant. |
| Wrist pin assembly | |
| Crankshaft connecting rod journal | |
| Connecting rod bearing inserts | |
| Crankshaft main journal | |
| Nonrubbing section of crankshaft | No significant activity. |
| Part of rocker arm in contact with bracket | |
| Remaining nonrubbing areas of rocker arm | |

[1] After six hours of engine operation unless otherwise noted.
[2] After three hours of engine operation.

In general, it was found that films were formed by the zinc dialkyl dithiophosphate on most of the rubbing surfaces of the engine. It is seen that on the basis of activity per unit of area, the most active parts were the highly loaded rubbing surfaces of the valve train mechanism, those areas known to give the highest wear in service. For example, the activity of the valve lifter faces or area that contacts the cam is at least a hundred times as great as the activity of the lifter side. Similarly, the activity on the push rods is concentrated at the ends—the rubbing areas under high load. Other active regions in the valve train mechanism included the cams, rocker arm bearing areas and valve stem tops. In a particular rocker arm bearing area, about 85% of the activity was in the scuffed half. Similarly, on the rocker arm shaft, only the scuffed half of the corresponding rocker arm bearing area had significant activity.

Areas of moderate but lower activity included the drive gear teeth on the distributor, piston rings, rubbing parts of the rocker arm shaft, the fuel pump eccentric and the sprocket teeth on the camshaft and crankshaft.

Showing very low but significant activity were the camshaft bearings, cylinder walls, wrist pin assemblies, and the crankshaft connecting rod journals. No significant activity was found on other rubbing surfaces in the engine. Radioactivity was found on the steel crankshaft connecting rod journals but not on the mating bearing inserts which consist of babbit over steel.

Next, autoradiographs were made of several of the metal parts by wrapping Kodak No Screen X-ray film around the parts to be tested, and then storing the wrapped part in the dark for two weeks. Upon development of the film, areas of high radioactivity were readily observed as dark regions. For example, the autoradiographs of the cams showed most activity at the cam noses, that region subject to the greatest pressure and wear.

As illustrated by the preceding example, an entire machine can be readily examined for critical areas of lubrication by the method of the invention. While the machine of the example was an automobile engine, it will be readily apparent that the technique can be extended to any sort of machinery wherein boundary lubrication and wear are problems.

While Example 1 was carried out using motor oils containing additives, these additives are not necessary for the operation of the method. Thus, Example 1 can be repeated using the same mineral lubricating oil but containing no other additives other than the radioactive zinc dithiophosphate, i.e. without the V.I. improver and the detergent additive. Using just the mineral oil and the radioactive additive will give similar results as those listed in the preceding table.

In summary, the present invention provides a method for readily determining critical lubrication areas in the moving parts of machinery. In design and test work this technique greatly simplifies the study of the effect of different variables, such as lubricant composition, materials of construction, surface roughness, geometry, type of motion, speed and load, on boundary lubrication and wear.

What is claimed is:

1. A method for the determination of critical areas of boundary lubrication and for predicting wear between relatively moving contacting surfaces, which comprises lubricating said surfaces with a lubricating oil solution containing a radioactive material capable of depositing a radioactive film on said surfaces under boundary lubrication conditions proportional to the amount of wear occurring between said contacting surfaces, rinsing said oil from said surfaces with a solvent to thereby remove said oil solution while leaving any radioactive film deposited on said surfaces undisturbed, and then measuring the degree of radioactivity of said surfaces.

2. A method of determining critical areas of boundary lubrication of relatively moving contacting ferrous surfaces which comprises lubricating said surfaces with a lubricating oil solution of a radioactive metal dialkyl dithiophosphate labeled with P³² whereby deposits containing said P³² are formed on said ferrous surfaces, draining said oil solution from said surfaces, rinsing said surfaces with a volatile solvent whereby any of said oil solution clinging to said surfaces can be rinsed off said surfaces to thereby leave said deposits as the sole source of P³² on said surfaces, and thereafter determining the degree of radioactivity of said deposits.

3. A method according to claim 1, wherein said radioactivity is measured with a radiation counting device.

4. A method according to claim 1, wherein said radioactivity is measured visually by use of photographic film.

5. A method for the determination of critical areas of boundary lubrication of relatively moving iron-containing parts subject to friction, which comprises lubricating the parts with a mineral oil solution of a dialkyl dithiophosphate having the general formula:

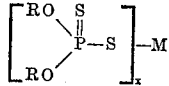

wherein R is a C₃ to C₁₅ alkyl group, M is a metal, x is the valence of the metal, while said phosphorus is P³², then rinsing said oil solution from said metal parts and measuring the degree of radioactivity of said parts.

6. A method according to claim 5, wherein said metal is zinc and said alkyl group contains 3 to 8 carbon atoms.

(References on following page)

References Cited in the file of this patent

UNITED STATES PATENTS

| | | |
|---|---|---|
| 2,811,650 | Wagner | Oct. 29, 1957 |
| 2,838,555 | Goldsmith | June 10, 1958 |
| 2,915,639 | Gilbert | Dec. 1, 1959 |
| 2,938,125 | Marak | May 24, 1960 |
| 2,946,891 | Wesolowski | July 26, 1960 |
| 2,957,986 | Quigg | Oct. 25, 1960 |

FOREIGN PATENTS

| | | |
|---|---|---|
| 754,384 | Great Britain | Aug. 8, 1956 |

OTHER REFERENCES

Kramer: "Radioactive Isotopes as Tracers," Power Plant Engineering, November 1947, pages 105 to 108.

Bacon: "Radioactive Tracers Used in Corrosion Studies," General Electric Review, May 1949, pages 7 to 10.

Linder: Abstract of application Ser. No. 90,331, pub. February 27, 1951, 643 Official Gazette 1333.

Arthur: Abstract of application Ser. No. 206,829, pub. February 26, 1952, 655 O.G. 1177.